June 10, 1924.
C. T. JACKSON
PLOWSHARE
Filed July 19, 1923
1,497,144
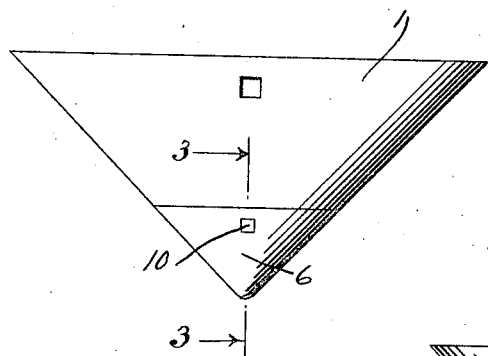
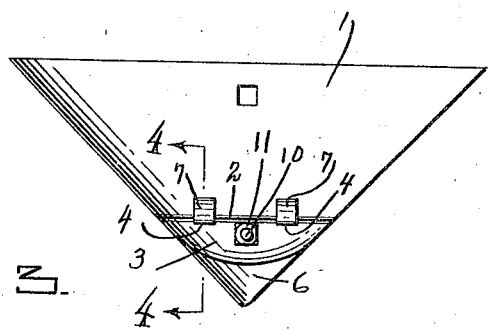
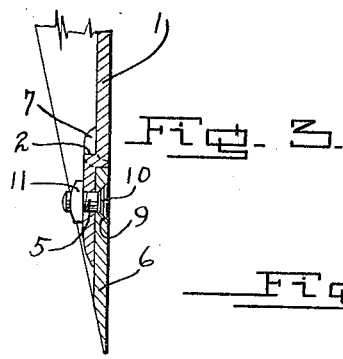
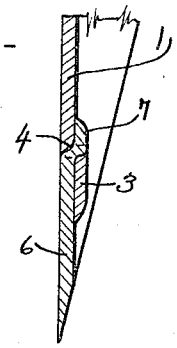
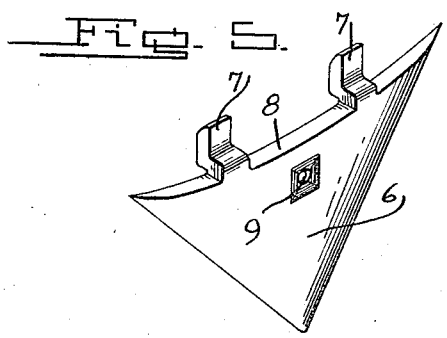
Inventor
C. T. Jackson.
By William J. Jacobi
Attorney Patented June 10, 1924.

1,497,144

UNITED STATES PATENT OFFICE.

CHARLES T. JACKSON, OF JEFFERSON, TEXAS.

PLOWSHARE.

Application filed July 19, 1923. Serial No. 652,547.

*To all whom it may concern:*

Be it known that CHARLES T. JACKSON, a citizen of the United States, residing at Jefferson, in the county of Marion and State of Texas, has invented certain new and useful Improvements in Plowshares, of which the following is a specification.

This invention relates to a plow share and has for its principal object to provide the same with a detachable plow point whereby the use of the plow share is prolonged.

Another important object of the invention is to provide a plow share of the above mentioned character with a detachable plow point wherein the latter may be easily and quickly placed in position thereon and which does not require the use of a complicated fastening means in order to hold the same in proper position on the plow share.

A still further object of the invention is to provide a plow share with a detachable plow point wherein the latter may be readily removed and renewed without the services of a skilled mechanic and furthermore will present the same strength and durability as a solid or integral point provided on a plow share.

Another important object of the invention is to provide a plow share of the above mentioned character with a detachable plow point which is simple in construction, inexpensive, strong and durable and well adapted for the purpose for which it is designated.

Other objects and advantages of this invention will become apparent during the course of the following description.

In the accompanying drawings forming a part of the specification and in which like numerals designate like parts throughout the same, Figure 1 is a top plan view of my plow share with the detachable point mounted thereon, Figure 2 is a bottom plan view thereof, Figure 3 is a sectional view taken on the line 3—3 of Fig. 1, Figure 4 is a sectional view taken on the line 4—4 of Fig. 2, and Figure 5 is a detail perspective of the detachable plow point.

In the drawings wherein for the purpose of illustration is shown the preferred embodiment of my invention, the numeral 1 designates a plow share which is in the form of a sweep. The plow share is provided at its forward end with a transversely extending shoulder 2, and whereby a portion 3 is formed for a purpose hereinafter to be more fully described. The shoulder 2 has provided therein the spaced slots 4. The offset portion 3 is provided with a centrally located aperture 5.

Adapted to be mounted on the offset portion 3 of the plow share 1 is the detachable point designated by the numeral 6. This detachable point 6 is substantially triangular in design and is provided with a pair of spaced tongues 7 on the upper edge thereof as more clearly shown in Fig. 5 of the drawings, and the purpose of these tongues 7 is to provide means for permitting the upper edge 8 of the plow point 6 to fit snugly against the shoulder 2 formed on the lower portion of the plow share 1, and the tongues 7 will be adapted to be received in the spaced slots 4 provided in the shoulder 2.

The plow point 6 is furthermore provided with an aperture 9 which is adapted to register with the aperture 5 provided in the offset portion 3 when the plow point 6 is in proper position on the offset portion, and when these apertures 5 and 9 register, a suitable locking bolt 10 is adapted to be inserted therein and a nut 11 is threaded upon the bolt 10 to further hold the plow point in proper position on the offset portion 3 and prevent the displacement of the same therefrom.

By providing the plow share 1 with the offset portion 3 in the manner heretofore described, the plow point 6 when in position on the plow share will rest upon the offset portion in such a manner as to have the top face of the plow point 6, flush with the top face of the body portion or plow share 1, as more clearly shown in Fig. 3 of the drawing. In this manner a plow share may be used indefinitely and as the plow points become worn due to considerable usage in cultivating the ground, it is not necessary to destroy the entire plow share, but only to remove the detachable plow point and replace the same with another. By providing a plow point of the above mentioned character, the same plow share may be used indefinitely and any number of plow points may be associated therewith. The simplicity of my construction enables a plow point to be detachably secured on the offset portion of the plow share in such a manner as to provide a complete plow share and point which will produce the same results as a plow share provided with an integral plow point, and also the manner of securing my plow point to the plow share will prevent the possibility of the same accidentally becoming disengaged from its supported position, and hence causing considerable damage.

The tongues 7 of my plow point, when received in the slot 4 provided in the shoulders 2 will cause the plow point to be interlocked with the plow share and also insure the proper fitting of the plow point on the plow share. With a plow point of the above mentioned character, it is not necssary to have a skilled mechanic in order to disassemble or assemble the detachable point with the plow share, and furthermore considerable time and labor is saved with the use of a device of the above mentioned character and it is not necessary for a person to have to wait to have the plow point re-sharpened before he can again use the plow.

From the foregoing description of the construction of my improved plow share, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to without departing from the spirit or sacrificing any of the principles of the invention.

I claim:

The combination of a plow share having a shoulder extending transversely across the lower portion thereof and forming an offset portion, said shoulder provided with spaced apertures therein, a plow point adapted to rest on said offset portion, said plow point having its upper edge provided with spaced tongues adapted to be received in said spaced slots, whereby said upper edge of said plow point is adapted to fit against said shoulder and cause the top face of said plow point to be flush with the top face of said plow share, said plow point and offset portion provided with registering apertures, and a bolt extending therethrough for detachably mounting said plow point on said plow share.

In testimony whereof I affix my signature.

CHARLES T. JACKSON.